Feb. 11, 1958    F. J. SCHREIER    2,822,986
RAIL FASTENER
Filed Nov. 9, 1954
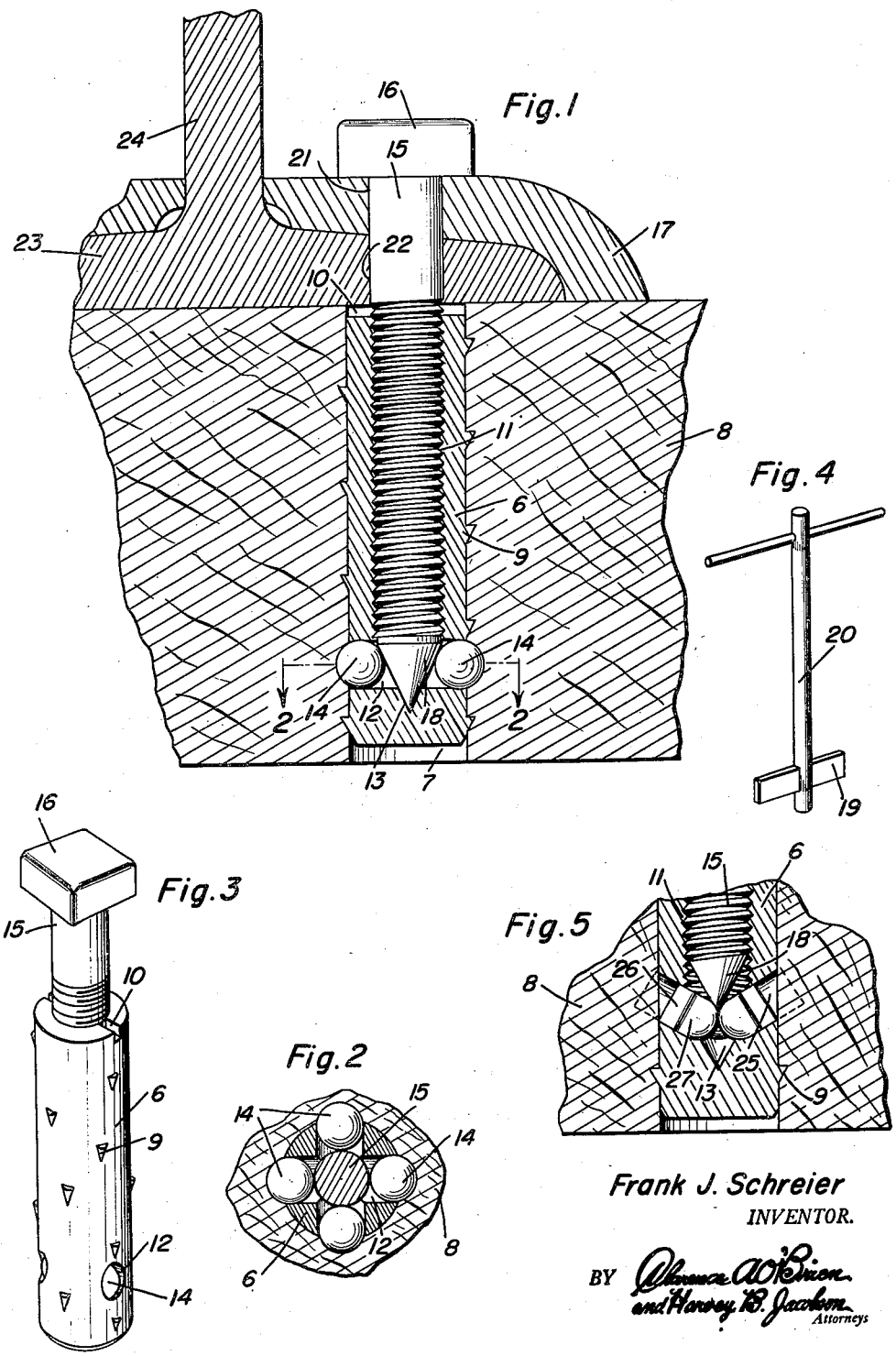
Frank J. Schreier
INVENTOR.

United States Patent Office 2,822,986
Patented Feb. 11, 1958

2,822,986
RAIL FASTENER
Frank J. Schreier, Chicago, Ill.
Application November 9, 1954, Serial No. 467,812
1 Claim. (Cl. 238—377)

The present invention relates to new and useful improvements in rail fasteners and has for its primary object to provide novel means for positively anchoring such rails to the cross ties in a manner to prevent spreading regardless of the weather, thus promoting safety.

Another very important object of the invention is to provide a rail fastener of the aforementioned character which, if desired, may be expeditiously removed and re-used.

Other objects of the invention are to provide a rail fastener of the character described which will be simple in construction, strong, durable, reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a vertical sectional view, showing a rail fastener embodying the present invention in use;

Figure 2 is a view in horizontal section, taken substantially on the line 2—2 of Figure 1;

Figure 3 is a perspective view of the device;

Figure 4 is a perspective view of a tool to be used in installing the fastener; and, Figure 5 is a fragmentary view in vertical section, showing a modification.

Referring now to the drawing in detail, it will be seen that reference character 6 designates an elongated socket of suitable metal, which socket may be of any desired dimensions. The socket 6 is adapted to be anchored in a vertical hole or bore 7 of appropriate diameter which has been formed in a cross tie, as at 8. Toward this end, the socket 6 is provided with a multiplicity of anchoring teeth or prongs 9. The upper end portion of the socket 6 is provided with a kerf 10, the purpose of which will be presently set forth.

As best seen in Figure 1 of the drawing, the socket 6 further includes a threaded bore 11. At the lower end of the threaded bore 11, the socket 6 has formed radially therein a plurality of openings 12. A centrally located seat 13 is provided in the lower end portion of the socket 6 in alignment with the bore 11.

The openings 12 are for the reception of a plurality of ball detents 14. A bolt 15 is threadedly mounted in the bore 11 of the socket 6, said bolt including on its upper end a head 16 which is adapted to bear on a fish plate, as at 17. The bolt 15 terminates in a smooth or unthreaded conical lower end portion 18 which is engageable with the ball detents 14 for forcing said detents outwardly to operative or locking position in the cross tie 8. The pointed or conical lower end portion 18 of the bolt 15 is engageable in the seat 13.

It is thought that the manner in which the fastener is used will be readily apparent from a consideration of the foregoing. Briefly, the hole 7 is bored in the tie 8 and the socket 6 is driven thereinto from the upper end thereof. The socket 6 is inserted flush with the top of the cross tie 8. The spurs or teeth 9 anchor the socket 6 in the cross tie. This locking action is furthered by inserting the plate 19 of a tool 20 in the kerf 10 and turning the socket 6. The ball detents 14 are then dropped into the socket 6, after which the bolt 15 is inserted, said bolt passing through an opening 21 provided therefor in the fish plate 17. The bolt 15 also passes through an opening 22 in the base 23 of the rail 24. When the bolt 15 is screwed home in the socket 6 the conical lower end portion 18 thereof engages and spreads the ball detents 14, embedding said detents in the tie 8 for still further anchoring the assembly in said tie. The fastener may be removed, if desired, for re-use by substantially reversing the foregoing procedure.

In the modification of Figure 5 of the drawing, the lower portion of the socket 6 is provided with a plurality of upwardly inclined openings 25 which communicate with the bore of said socket. Substantially wedge-shaped detents 26 are slidably mounted in the openings 25, said detents including rounded inner end portions 27 with which the conical lower end portion 18 of the bolt 15 is engageable. In other respects this form of the invention is substantially similar in construction and operation to the embodiment shown in Figure 1 of the drawing.

It is believed that the many advantages of a rail fastener constructed in accordance with the present invention will be readily understood, and although preferred embodiments of the device are as illustrated and described, it is to be understood that changes in the details of construction may be resorted to which will fall within the scope of the invention as claimed.

What is claimed as new is as follows:

A rail fastener of the character described comprising: an elongated internally threaded, vertical metallic socket to be slidably driven into a cross-tie and having a plurality of upwardly and outwardly inclined openings in its lower portion, anchoring spurs on the socket to be embedded in the tie, said socket further having a kerf in the upper end thereof for the reception of a tool for turning the socket for disaligning the spurs from the grooves left thereby in the tie when said socket is driven thereinto, a plurality of substantially wedge-shaped detents slidable in the openings, and a headed bolt threadedly mounted in the socket and including a cone on its lower end engageable with the detents for embedding same in the tie, said detents comprising rounded inner ends engageable with said cone, said socket still further having a conical seat in its lower portion for the reception of the cone.

References Cited in the file of this patent
UNITED STATES PATENTS

| | | |
|---|---|---|
| 813,006 | Johnson | Feb. 20, 1902 |
| 951,230 | Borth | Mar. 8, 1910 |
| 1,244,848 | Gadke | Oct. 30, 1917 |
| 1,926,798 | Baumbach | Sept. 12, 1933 |

FOREIGN PATENTS

| | | |
|---|---|---|
| 999,389 | France | Oct. 20, 1942 |
| 11,468 | Great Britain | June 4, 1901 |